PRESSURE FORMING APPARATUS

Original Filed May 17, 1957 4 Sheets-Sheet 1

INVENTOR
HARRY EYBERGER
BY Shanley & O'Neil
ATTORNEYS

PRESSURE FORMING APPARATUS

Original Filed May 17, 1957 4 Sheets-Sheet 2

INVENTOR
HARRY EYBERGER

BY Stanley & O'Neil
ATTORNEYS

PRESSURE FORMING APPARATUS

Original Filed May 17, 1957 4 Sheets-Sheet 3

INVENTOR
HARRY EYBERGER
BY Shanley & O'Neil
ATTORNEYS

PRESSURE FORMING APPARATUS

Original Filed May 17, 1957 4 Sheets-Sheet 4

INVENTOR
HARRY EYBERGER

BY Shanley & O'Neil
ATTORNEYS

United States Patent Office

Re. 25,441
Reissued Sept. 10, 1963

25,441

PRESSURE FORMING APPARATUS

Harry Eyberger, Collingswood, N.J., assignor to Magnetics, Inc., a corporation of Pennsylvania Original No. 3,063,098, dated Nov. 13, 1962, Ser. No. 659,925, May 17, 1957. Application for reissue Mar. 29, 1963, Ser. No. 269,225
11 Claims. (Cl. 18—42)

Matter enclosed in heavy brackets [ ] appears in the original patent but forms no part of this reissue specification; matter printed in italics indicates the additions made by reissue.

This invention relates to the formation of bodies of compressed metallic particles, such as magnetic bodies of compressed insulated particles of magnetic material. In particular, the invention relates to novel apparatus for forming integral bodies from powdered metallic material, including insulated particles of magnetic material, under high pressure, and to a novel magnetic body formed of compressed particles of magnetic material having improved magnetic, electrical and mechanical characteristics.

The formation of certain bodies of compressed metallic particles, such as the formation of toroidal magnetic cores of compressed insulated particles of magnetic material, requires application of extremely high pressures, such as 200,000 to 250,000 pounds per square inch. For this operation, a molding die is employed presenting a pressure or molding cavity of toroidal shape, for example, into which a measured quantity of powdered material, such as insulated particles of magnetic material, is deposited. A pressure ring is placed in the cavity over the charge of powdered material and the required pressure is applied through the pressure ring to form the powdered material into an integral body of a shape theoretically determined by the configuration of the pressure cavity In view of the high pressures required, it has been necessary in the past to employ a molding die made up of a plurality of removable arcuate die sections in order to permit withdrawal of the formed body from the pressure cavity. Ordinarily, three arcuate die sections have been employed to form a sectional ring about a center plug with a pressure cavity therebetween, the outer and inner contour of the pressure cavity being defined by the innermost surfaces of the die sections and the center plug, respectively. The arcuate die sections are positively clamped on a suitable platform or table about the center plug in end-to-end relation to form the cavity, and after the required pressure is applied to the charge of powdered material through the pressure ring, the die sections are unclamped from the platform and moved away from the formed body to permit the body to be removed from the center plug. The necessity of unclamping the die sections to permit removal of a formed body and of reclamping the die sections in proper relation with the center plug before formation of another body of compressed powdered material, does not lend to formation of compressed bodies of magnetic material in an automatic operation. Thus the prior teachings requiring the use of a plurality of die sections has made it impractical to form bodies of compressed powdered material in an automatic operation.

When the required forming pressure is applied to a charge of powdered material in a cavity of a molding die including a plurality of arcuate die sections, the outer contour of the pressure cavity becomes distorted, that is, the outer wall of the cavity defined by the die sections flexes outwardly away from the center plug. After the pressure is relieved the die sections return to their original shape causing distortion or flexure of the formed body. The flexure of the formed body impairs the desired properties of the body and establishes undesired stresses in the body which may even cause the body to crack when the die sections are removed. Although attempts have been made to design the arcuate die sections in such a manner as to permit distortion while under pressure and allow the sections to return to their normal shape when the pressure is released without appreciably distorting the outer contour of the pressure cavity, the permitted flexure results in the formation of a body having non-uniform density characteristics which impairs its magnetic and electrical properties and reduces its strength.

Furthermore, the use of a plurality of arcuate die sections to form the outer contour of the pressure cavity results in the formed body being subjected to substantially lower pressures along the dividing line between adjacent die sections. The application of substantially different pressures during formation of the body is believed to result in further impairment of the desired uniform density characteristics of the body and provides a body of non-uniform permeability in cases where magnetic material is employed. As a result of the relieved pressure along the dividing lines between the arcuate die sections, the core has an outside surface including a number of seams, equal to the number of die sections employed, which break the continuity of the skin of the core and provide regions of non-uniform density. The foregoing impairs the magnetic, electrical and mechanical properties of the core.

It is an object of the present invention to provide novel apparatus which overcome the disadvantages outlined above.

Another object is to provide a novel molding die for forming cores of highly compressed metallic particles, such as insulated particles of magnetic material, capable of automatic operation.

In general, the present invention provides a novel arrangement for forming integral bodies of compressed powdered material by substantially uniformly subjecting powdered material in a pressure cavity to relatively high pressure without flexure or deformation of the body during the forming process or upon releasing the pressure following the forming process, and of removing bodies of compressed powdered metallic material from a pressure cavity. In particular the present invention provides a novel molding die, capable of forming cores in an automatic operation, having a pressure cavity including an outside continuous or closed surface formed on a body member comprising a single piece of material and an inside continuous or closed surface formed on a center plug or member relatively movable with respect to the body member. The inside and outside continuous surfaces are formed in predetermined relative relationship to permit withdrawal of a formed core from the pressure cavity upon relative movement between the body member and the center plug along the longitudinal axis of the formed core. Magnetic cores produced by the novel methods and apparatus of the present invention are of more uniform density and permeability and possess improved magnetic, electrical and strength characteristics. In the preferred form of the invention the inside and outside continuous surfaces present substantially circular and substantially concentric inner and outer pressure cavity walls which provide more equal distribution of the forming pressure throughout the body.

The foregoing and other objects and features of the present invention will appear more fully from the following detailed description considered in connection with the accompaying drawings which disclose several embodiments of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views.

Figure 1:
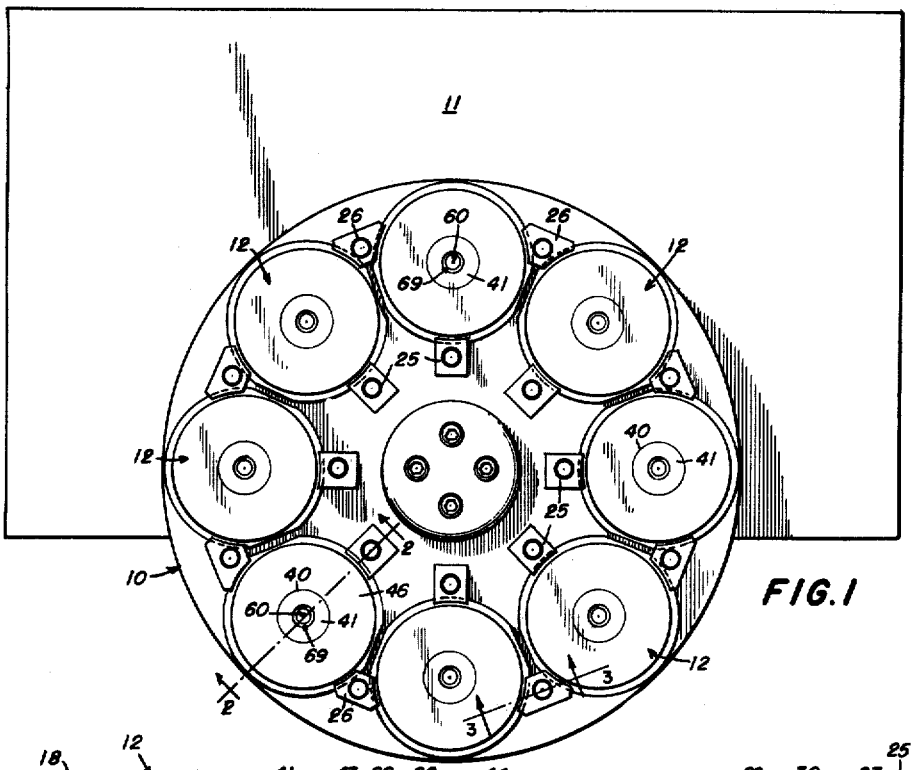
FIGURE 1 is a diagrammatic plan view of an automatic machine including a plurality of novel molding dies provided by the present invention.

A machine for automatically producing bodies of compressed metallic particles, such as insulated particles of magnetic material, according to the principles of the present invention is shown in FIGURE 1 of the drawings [included] *including* a table 10 mounted for rotation about its center in a horizontal plane above a support 11. A plurality of molding dies 12 are mounted on the upper surface of the table 10 at equally spaced angular positions and radial distances with respect to the center of rotation of the table. The machine includes a plurality of stations, not shown, located about the table 10 for successive cooperation with the molding dies 12 upon rotation of the table in a predetermined direction. Specific mechanisms are provided at the stations to perform particular functions, in cooperation with the molding dies, required in the formation of a core, such as introducing a measured quantity of powdered material into the die cavity, compressing the material to form an integral core and ejecting the formed core from the molding die. The molding dies are designed in a novel manner and cooperate with the station mechanisms to provide automatic operation and high speed formation of cores. It is to be expressly understood that a number of molding dies greater or less than the number shown in the drawing may be employed, as desired.

Figure 2:
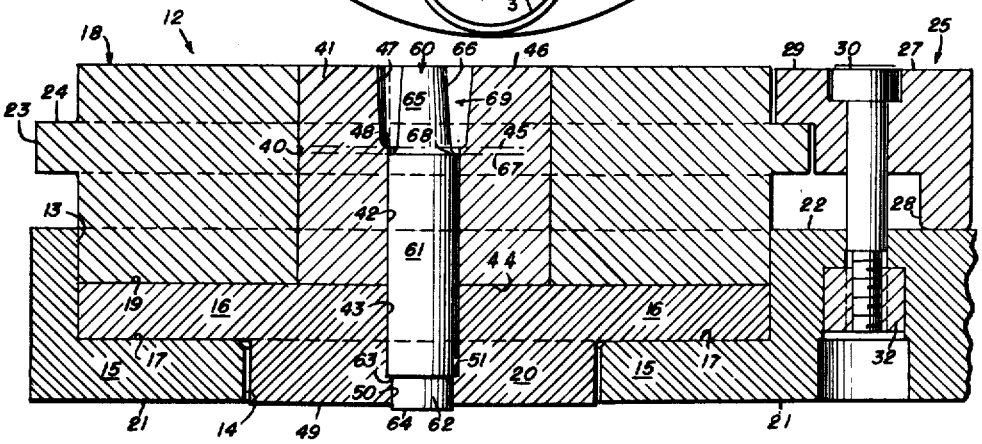
FIGURE 2 is a view in section taken along the line 2—2 of FIGURE 1.

The table 10 is provided with a plurality of circular recesses 13 formed in its upper surface, the number of circular recesses being equal to the number of molding dies 12. The table 10 is also provided with enlarged openings 14 extending through its lower wall 15, an enlarged opening being formed in each of the circular recesses in concentric relation therewith. As shown in FIGURE 2, the molding dies include a cylindrical backing plate 16 positioned in a circular recess 13 and resting on its bottom surface 17, and a circular *outer* body member 18 positioned in the circular recess in contact with the upper surface 19 of the backing plate. The outside diameters of the backing plate 16 and the body member 18 are such as to provide a snug fit between their outer peripheral surfaces and the side walls of the circular recess. The backing plate 16 includes a downwardly depending cylindrical portion 20 of reduced diameter to freely enter the opening 14 in the bottom wall 15 of the table. The cylindrical depending portion 20 extends throughout the depth of the wall 15 and projects slightly downwardly beyond the lower surface 21 of the table 11. The body member 18 extends upwardly above the upper surface 22 of the table 11, and includes an outwardly extending circumferential flange 23 presenting an annular surface 24 parallel to and spaced from the upper surface 22. The circumferential flange 23 cooperates with clamping devices 25 and 26 for positively retaining the backing plate and body member of the molding dies in respective circular cavities 13 of the table 10.

Figure 3:
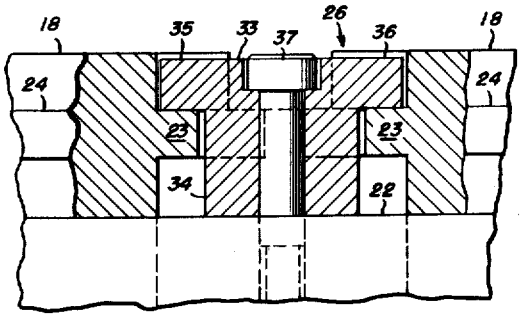
FIGURE 3 is a view in section taken along the line 3—3 of FIGURE 1.

As shown in FIGURE 1, each of the molding dies is provided with an inner clamping device 25 lying along a radial line of the table passing through the center of respective molding dies and a pair of opposed outer clamping devices 26, 26 is displaced approximately 120° from the respective inner clamp 25, each of the outer clamping devices 26 being associated with a pair of adjacent molding dies. As illustrated in FIGURE 2, the inner clamping devices 25 include an L-shaped block 27 having a leg portion 28 adapted to contact the upper surface 22 of the table and an outwardly extending flange 29 adapted to contact a portion of the annular surface 24 of the body member, the outer edge of the flange 29 being curved to correspond to the curvature of the body member 18. The block is secured in clamping position as shown by a bolt 30 passing through suitable openings in the block and the table and a cooperating nut 32 on the underside of the table. The outer clamping devices 26 may be of the type shown in FIGURE 3 of the drawings. These clamping devices comprise a T-shaped block 33 having a central leg 34 adapted to contact the table surface 22 and a pair of oppositely disposed flanges 35 and 36 adapted to contact the annular surfaces of adjacent body members, the outer edges of the flanges are oppositely curved in conformance with the survature of the side walls of the body members. The block 33 is secured by a bolt 37 anchored to the table 10. With this clamping arrangement, the molding dies are secured in respective circular recesses and onto the table. It is to be expressly understood that other types of clamping means may be employed.

The body member 18 of the molding die is preferably provided with a centrally disposed enlarged bore 40 receiving a cylindrical insert *or inner body member* 41 comprising a single piece of carbide material. The circular bore 40 and the carbide insert 41 may extend throughout the depth of the body member 18, and the carbide insert is maintained in the bore 40 under pressure to provide an integral structure. The carbide insert 41 and the backing plate 16 are provided with axially aligned bores 42 and 43, respectively, concentrically positioned with respect to the circular recess 13. The bore 42 is of constant diameter and extends upwardly, as viewed in the drawing, from the lower surface 44 of the body member *41* to a plane 45 perpendicular to the longitudinal axis of the bore 42 and located below the upper surface 46 of the body member *41*. At the plane 45, the bore 42 merges with an enlarged opening in the insert 41 extending upwardly from the plane 45 to the upper surface 46 of the body member *41*. The enlarged opening is defined by a continuous internal surface 47, of circular cross-section, formed on the insert in concentric relation with the longitudinal axis of the bore 42, and the internal surface 47 is uniformly inclined from the upper surface 46 of the body member *41* inwardly toward the longitudinal axis of the bore 42. In the region of the enlarged opening above the plane 45, the inclined continuous internal surface 47 is merged with the bore 42 by a curved annular surface 48 formed on the insert. The bore 43, formed in the backing plate 16 in axial alignment with the bore 42, is of uniform diameter of the fore 42, and extends from the upper surface 19 of the backing plate downwardly, as viewed in the drawing, and terminates within the cylindrical depending portion 20 in spaced relation with its lower surface 49. At its terminating end, the bore 43 merges with a bore 50, of reduced diameter, extending throughout the portion 20 to the surface 49. The bore 50 is in axial alignment with the bores 42 and 43, and forms an upwardly facing annular shoulder 51 at the terminating end of the bore 43.

The molding die further includes a cylindrical center plug or member 60 which provides the inside surface and a portion of the bottom surface of the pressure or molding cavity of the die, and also functions as a means for removing formed cores from the cavity. As shown, the center plug 60 includes an intermediate cylindrical portion 61, of uniform diameter, adapted to be snugly received by the bores 42 and 43 for axial movement therein. The center plug 60 also includes a cylindrical bottom portion 62 extending downwardly from the lower end of the intermediate portion into the bore 50 of the projection 20, the bottom portion being in concentric relation with the longitudinal axis of the center plug. This construction presents a downwardly facing annular shoulder 63 at the end of the intermediate portion 61, the shoulder 63 being adapted to engage the annular flange 51 and limit downward movement of the center plug relative to the body member. The bottom portion 62 extends downwardly a distance greater than the depth of the bore 50 so that its end face 64 lies in a plane displaced a slight distance below the lower surface 49 of the cylindrical projection 20 when the center plug is in its lowermost position. The purpose of this arrangement will be described more fully below.

The center plug is provided with a top portion 65 having a continuous external surface 66, of circular cross-section, in concentric relation with the central longitudinal axis of the center plug and the bores 42 and 43. The surface 66 is inclined from the upper surface 46 of the body member outwardly away from the longitudinal axis of the center plug. The upper end of the intermediate portion 61 terminates in a plane 67 perpendicular to the longitudinal axis of the center plug, and the lower circular edge of the inclined surface 66 is merged with the upper circular edge of the intermediate portion by a curved annular surface 68. The plane 67 is spaced below the plane 45 a distance corresponding to the vertical displacement between the end face 64 and the lower surface 49 of the portion 20 so that upon movement of the end face 64 into the plane of the lower surface 49, the resulting upward movement of the center plug relative to the body member positions the upper circular ends of the bore 42 and the intermediate portion 61 in a common transverse plane. The inclined surface 47 of the insert 41 and the inclined surface 66 of the center plug 60 respectively define inside and outside concentric side walls of a toroidal pressure or molding cavity 69. The lower portions of the inner and outer side walls and the bottom of the pressure cavity 69 are defined by the annular curved surfaces 48 and 68.

Figure 4:
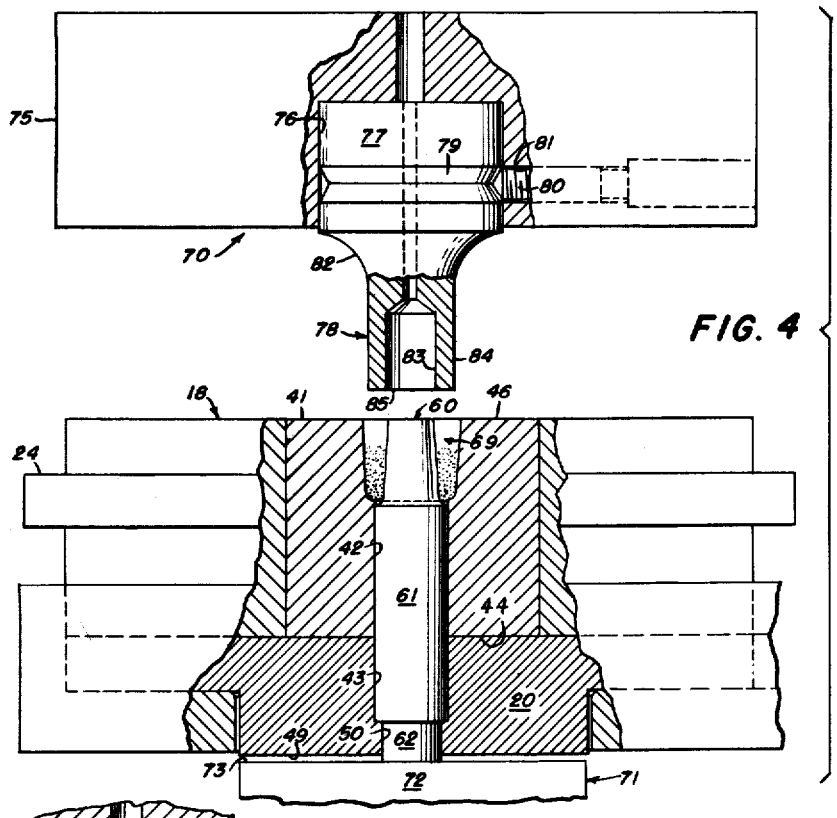
FIGURE 4 is an elevational view, partly in section, illustrating the novel molding die and pressure ring provided by the present invention.

In FIGURE 4 of the drawings, a molding die is shown at the pressing or core forming station. The mechanism for effecting the core forming operation includes a pressure device 70 located above the molding die and a load carrying member or anvil 71 positioned below the table beneath the molding die. The anvil 71 is mounted independently of the table on a foundation, not shown, suitable for carrying the high pressure applied during the core forming operation. The upper end of the anvil comprises a cylindrical metal block 72 presenting a flat, horizontally disposed upper surface 73. The diameter of the cylindrical block 72 may be approximately equal to the diameter of the projecting portion 20 of the backing plate 16 and is positioned with its central longitudinal axis aligned with the longitudinal axis of the center plug when the molding die is properly positioned at the core forming station. The vertical position of the upper surface 73 relative to the table may be such that the lower end face 64 of the center plug 60 is in contact therewith, while the lower face 49 of the cylindrical projecting portion 20 is spaced therefrom, upon movement of a molding die to the core forming station, as shown in FIGURE 4. With this arrangement core forming pressure is transmitted to the anvil independently of the table as will appear more fully below. The pressure device 70 includes a pressure plate or cylindrical block 75 having a centrally disposed cylindrical cavity 76 on its lower side adapted to receive a cylindrical plug 77 including an integrally formed downwardly depending pressure ring 78. The plug 77 includes a horizontally disposed circumferential groove 79, lying within the cylindrical cavity 76 and receiving one end of one or more pins, such as pin 80 carried in a horizontal bore 81 formed in the pressure plate, to retain plug in the cylindrical cavity. The pressure ring 78 is joined to the plug 77 through a tapered portion 82, and comprises an elongated annular member including concentric inner and outer cylindrical surfaces, 83 and 84, respectively, and a terminating annular end face 85 lying in a plane perpendicular to the central longitudinal axis of the pressure ring. The depth of the inner and outer cylindrical surfaces 83 and 84 and the spacing of the surfaces 83 and 84 from each other and from the central longitudinal axis of the pressure ring are determined in accordance with the dimensions of the pressure cavity.

The pressure plate 75 is mounted by guide means, not shown, for movement parallel to the longitudinal axis of the center plug 60, such as vertical movement, and is positioned relative to the table so that the central longitudinal axis of the pressure ring is in axial alignment with the central longitudinal axis of the center plug when the molding die is positioned at the core forming station. A suitable pressure applying means, such as a hydraulic system, not shown, is associated with the pressure plate 74 to move the pressure ring downwardly and into the pressure cavity 68 of the molding die and apply pressure required to form an integral core from powdered magnetic material.

Figure 5:
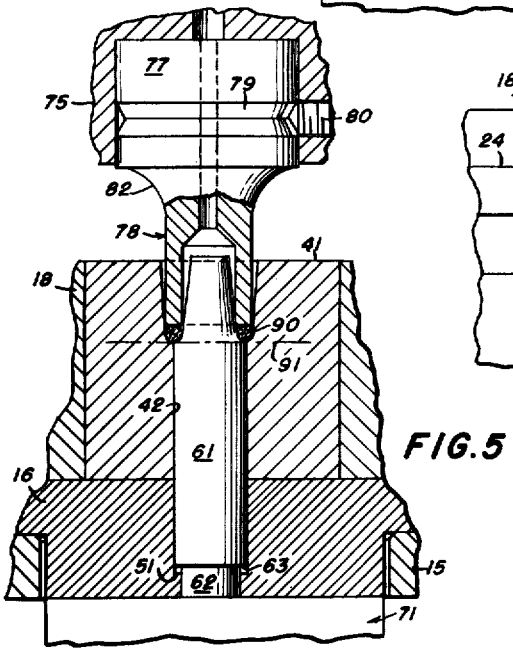
FIGURE 5 is an elevational view, in section, illustrating the relative position of the molding die and pressure ring during a core forming operation.

In FIGURE 5 the molding die and the pressure ring are illustrated in their relative positions during a core forming operation. As shown, the pressure ring is moved to within the cavity of the molding die having a magnetic core 90 therein formed under extremely high pressure. The pressure applied to the molding die is transmitted through the center plug 60 and the body member and the projecting portion 20 of the backing plate to the anvil 71 independently of the table 15. During the core forming operation the end face 64 of the center plug and the lower surface 49 of the projecting portion 20 contact the upper horizontal surface 73 of the anvil, and the upper ends of the bore 42 and of the intermediate portion 61 of the center plug lie in a common plane 91 perpendicular to the longitudinal axis of the bore 42.

Figure 6:
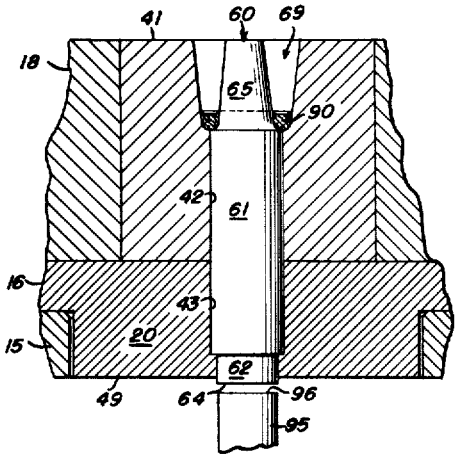
FIGURE 6 is an elevational view, in section illustrating the position of the molding die relative to core ejecting means.
Figure 7:
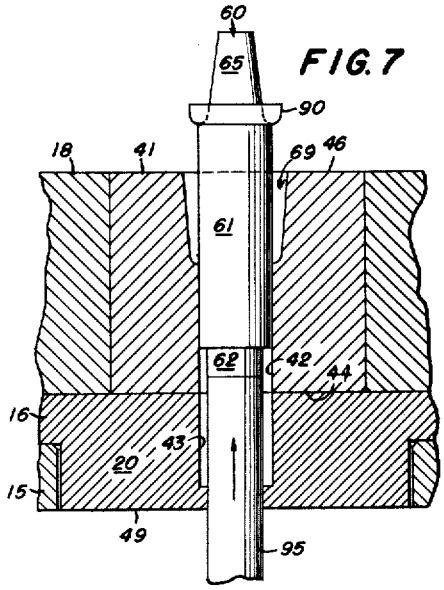
FIGURE 7 is an [elevation] *elevational* view, partly in section, illustrating the core ejecting operation provided by the present invention.

FIGURE 6 of the drawings shows a molding die at the ejector station, and FIGURE 7 illustrates the manner a formed core is ejected from the molding die. The ejector station mechanism includes an ejector rod or plunger 95 mounted by suitable guide means, not shown, for movement parallel to the longitudinal axis of the center plug 60, and positioned with respect to the center of rotation of the table so that its central longitudinal axis substantially coincides with the central longitudinal axis of the center plug when the molding die is moved to the ejector station. Power means, not shown, is provided for applying reciprocating movement to the plunger 95, to move the plunger between its non-ejecting position shown in FIGURE 6 and its ejecting position shown in FIGURE 7. When the plunger is in the non-ejecting position, its upper end face 96 lies in a plane displaced below the plane of the end face 64 of the center plug when the center plug is normally positioned relative to the body member. Upon upward movement of the plunger 95, its end face 96 contacts the lower end of the center plug and moves the center plug upwardly relative to the body member 18. The formed core 90 moves upwardly with the center plug and is ejected from the pressure cavity. The stroke of the plunger is preferably such as to move the core 90 to a position above the upper surface 46 of the body member for removal from the center plug by any suitable device, such as by magnetic means. Upon removal of the core the plunger is moved downwardly to its non-ejecting position to permit movement of the molding die from the ejector station. In some cases it may be desirable to move a supporting member to beneath the core 90 when the center plug is positioned in the manner shown in FIGURE 7, and to thereafter positively move the center plug downwardly relative to the core, by any suitable downwardly movable means located above the center plug, not shown, in order to release the core from the center plug, the supporting means being operable, if desired, to deliver the core from the machine.

Figure 8:
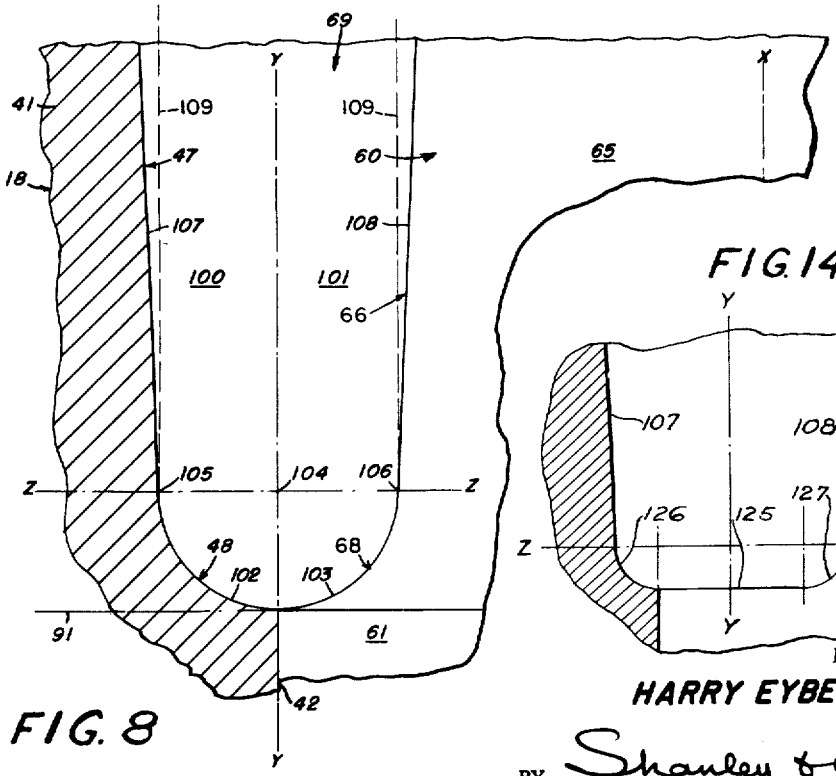
FIGURE 8 is an enlarged fragmentary view, in section, illustrating details of the pressure cavity provided by a molding die constructed in accordance with the principles of the present invention.

An enlarged sectional view of one side of the pressure cavity 69 shown in FIGURE 8 of the drawings illustrates in detail the shape of the surfaces 47, 48, 66 and 68 and their interrelationship in defining the pressure cavity according to one embodiment of the invention. As shown, the vertical axis X—X comprises the central longitudinal axis of the center plug 60 or the bore 43, and the axis Y—Y is coextensive with the line of contact between the intermediate portion 61 of the center plug and the bore 42. In view of the snug fit between the center plug and the bore 42, the external surfaces of the intermediate portion 61 of the center plug and the internal surface of the bore 42 may be considered as lying in a cylindrical plane concentric with the axis X—X, and any vertical section passing through the axis X—X would cut the cylindrical plane along a vertical line parallel to the axis X—X, such as the axis Y—Y. The axis Y—Y divides the pressure cavity 69 into zones 100 and 101 of equal cross sectional area which are symmetrical with respect to the axis Y—Y. The bottom of the pressure cavity 69 is defined by the curved annular surfaces 48 and 68 formed on the insert and the center plug, respectively, above the upper ends of the bore 42 and the intermediate portion 61, respectively, in concentric relation with the axis X—X. In cross-section, the curved annular surfaces 48 and 68 form 90° arcs of circles of equal radius, i.e., arcs 102 and 103, respectively, and when the upper ends of the bore 42 and the intermediate portion 61 lie in the common plane 91, the arcs 102 and 103 form a semicircle having a center at point 104 lying on the axis Y—Y and in a plane Z—Z perpendicular thereto and passing through points 105 and 106 at the upper extremities of the arcs 102 and 103, respectively. The inclined surfaces 47 and 66 of circular cross-section define, in vertical section, straight lines 107 and 108, respectively, the line 107 being located on one side of the axis Y—Y and extending upwardly from the point 105 and being inclined outwardly from the axis Y—Y, and the line 108 being located on the other side of the axis Y—Y and extending upwardly from the point 106 and being inclined outwardly with respect to the axis Y—Y. Broken lines [109] *109—109* passing through points 105 and 106 in parallel relation with the axis X—X, illustrate the equal taper of the inner and outer side walls of the pressure cavity with respect to the axis Y—Y.

As mentioned above one of the objects of the present invention is to provide a novel molding die including a single piece die body capable of forming cores of compressed metallic particles of powdered material in an automatic operation. This object is accomplished, in part, by the provision of a pressure cavity including inner and outer side walls defined by oppositely inclined or tapered surfaces. The feature of providing a pressure cavity including an outer wall surface inclined inwardly toward the central longitudinal axis of the core permits a formed core to be removed from the cavity upon movement of the core relative to the outside surface of the cavity in a direction corresponding to the direction the outer wall surface of the cavity tapers away from the longitudinal axis of the core without applying excessive pressures to the core which would impart injury to the core. Also, the feature of providing such a cavity with an oppositely tapered inside surface makes it possible to remove the core from the center plug upon movement of the core in the same direction relative to the center plug, i.e., in a direction corresponding to the direction the inner surface tapers toward the longitudinal axis of the core. It will therefore be appreciated that the feature of providing a pressure cavity defined by oppositely tapered inner and outer side walls, in combination with a pressure die including a single piece die body and a center plug movably mounted relative to the die body in which the inner surface of the cavity is formed on the center plug and the outer surface of the cavity is formed on the die body eliminates the prior necessity of employing a plurality of [removal] *removable* die sections and makes it possible to form cores of compressed powdered material in an automatic operation. In particular, after the core forming pressure is applied and the pressure ring moved to its retracted position, the center plug may be moved relative to the die body in a direction corresponding to the direction the outer surface of the cavity tapers away from the longitudinal axis of the core, upwardly as viewed in the drawings, to move the formed core relative to the die body and out of the cavity defined by the wall of the die body. Thereupon, the core may be moved relative to the center plug in a direction corresponding to the direction the inner surface of the pressure cavity tapers toward the longitudinal axis of the core, to move the core from the center plug. The latter operation may be accomplished in a number of ways such as by inserting a cradle beneath the core when positioned as shown in FIGURE 7 and then applying a downward force on the center plug of a magnitude necessary to terminate contact between the core and the center plug. By providing the surfaces defining the pressure cavity with a thin film of lubricating oil the cores may be easily removed from the pressure cavity upon application of pressures of a relatively low order of magnitude materially less than the magnitude of pressures that may impart damage to the core. The degree of taper of the inner and outer side walls is shown exaggerated in the drawings for the purpose of clarity. In actual practice it has been found that a taper of the order of one degree is adequate for the inner and outer side walls of a pressure cavity designed for forming magnetic cores. It is to be expressly understood that tapers in excess of one degree may be employed if desired. In addition, the feature of employing a pressure cavity defined by oppositely inclined concentric inner and outer surfaces permits the pressure cavity to be reformed to compensate for wear. The surfaces of pressure cavity which contact powdered metallic material, especially when under high pressure, that is, the surfaces of the cavity which define the formed core, are subject to wear due to abrasive action of the powdered particles, and eventually the cavity size will change and cores of the desired dimensions cannot be obtained. With a pressure cavity of the character provided by the present invention, it is possible to reform the lower portion of the pressure cavity by merely extending the depth of the pressure cavity in accordance with a predetermined shape. This feature eliminates the disadvantage of prior molding dies in which the bottom face of the die body as well as the contacting surfaces of the die sections are required to be ground in order to compensate for wear of the surfaces defining the cavity.

The novel feature provided by the present invention of forming a pressure cavity composed of two zones 100 and 101 which are symmetrical about the axis Y—Y, results in equal distribution of the core forming pressure to the center plug and the body member and assures substantially uniform application of pressure to the core. This arrangement provides a core of maximum strength and improved uniform density characteristics. The further feature of defining the bottom portion of the pressure cavity by cooperating curved annular surfaces which are symmetrical with respect to the axis Y—Y, insures substantially equal distribution of forces throughout the core and minimizes development of localized stresses in the core structure.

Figure 9:
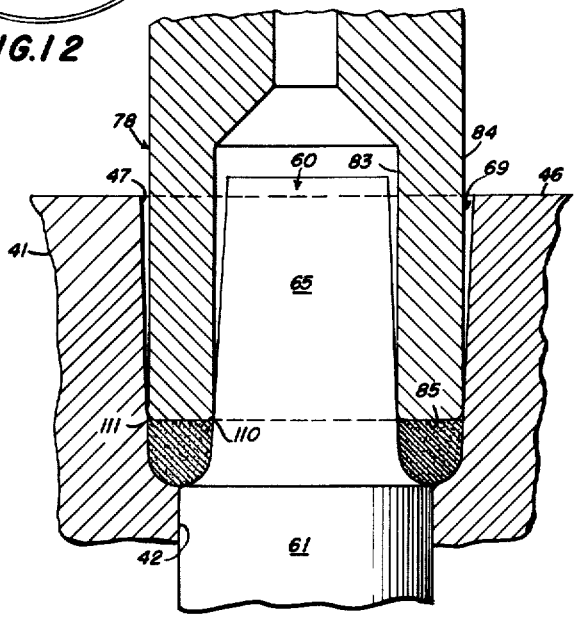
FIGURE 9 is an enlarged fragmentary view, in section, illustrating another embodiment of the present invention.
Figure 10:
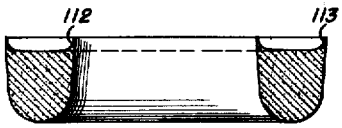
FIGURE 10 is a view, in section, of a magnetic core during a phase of its formation according to a core forming method provided by the present invention.
Figure 11:
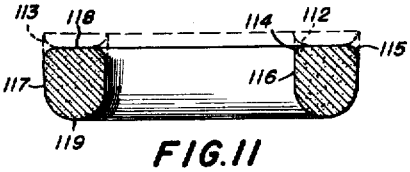
FIGURE 11 is an elevational view, in section, of a magnetic core provided by the present invention.

In the formation of magnetic cores pressed from insulated particles of magnetic material under extremely high pressure it has been found that the presence of air trapped in the powdered material may have a disadvantageous effect upon the properties of the formed core, depending upon the permeability of the core, which is determined, for the most part, by the size of the particles and the thickness of the insulation. In the formation of low permeability cores by compressing heavily insulated and finely divided particles of magnetic material, it is believed that trapped air collects in the powdered material adjacent the lower surface of the pressure ring and prevents the formation of the powdered material in this region into an integral mass with the remaining portion of the powdered material. It has been found that this phenomenon results in the formation of cores which are weak at its end which contacts the pressure ring during the forming operation, and frequently the outer surface of the core at this end will split from the main body of the core. The present invention provides a novel arrangement for overcoming this problem. As shown in FIGURE 9, the inner and outer annular edges of annular end face 85 and the lower edges of the cylindrical inner and outer side walls 83 and 84 are joined together by annular curved surfaces 110 and 111, respectively. When a pressure ring shaped in this manner is moved downwardly into a pressure cavity and into pressure contact with a charge of powdered material, a portion of the powdered material including trapped air is forced outwardly toward the inner and outer surfaces of the cavity and collects in upstanding circumferential recesses located between the inner surface of the cavity and the inner curved annular surface 110 of the pressure ring, and between the outer surface of the cavity and the outer curved annular surface 111 of the pressure ring. As shown in FIGURE 10, a core formed with the type of pressure ring described above, includes inner and outer circumferential upstanding lips 112 and 113 which are of different density and are relatively weak with respect to the remaining portion of the core comprising an integral mass substantially free of trapped air. After the core is removed from the molding die, the circumferential lips 112 and 113 may be removed by a simple grinding operation at which time the inner and outer concentric edges of the core at its upper end may be rounded, such as at 114 and 115, to provide a core as shown in FIGURE 11. It has been determined that in the formation of cores of high permeability, requiring lightly insulated, coarse particles of magnetic material, the strength of the core is not affected by the presence of air that may be trapped in the powdered material during the core forming operation, and that a pressure ring having the inner and outer annular edges of its end face 85 lying in the plane of the side walls 83 and 84, respectively, may be employed, such as a pressure ring of the shape illustrated in FIGURE 4. In actual operations it has been determined that magnetic cores of a permeability of the order of 125 may be formed with a pressure ring having an end face shaped in the manner shown in FIGURE 4, while magentic cores of a permeability of 60 or less should be formed with a pressure ring of the character illustrated in FIGURE 9.

Figure 12:
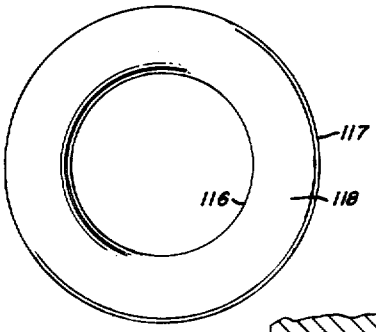
FIGURE 12 is a plan view of a magnetic core provided by the present invention.
Figure 13:
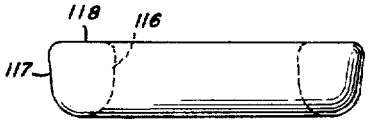
FIGURE 13 is a view in side elevation of a magnetic core provided by the present invention.

As shown in FIGURES 11, 12 and 13, a core formed of pressed powdered magnetic material employing the principles of the present invention includes substantially perfectly circular, concentric inner and outer wall surfaces 116 and 117, which are continuous and substantially smooth, and continuous top and bottom surfaces 118 and 119 which merge smoothly, without surface interruptions, such as grooves or raised portions, into the side wall surfaces. In addition, the core is of substantially uniform density transversely of the section, that is, in any section of the core lying in a plane perpendicular to the longitudinal axis of the core, the core structure is of substantially uniform density. With this construction the outer circumferential marginal portion of the core, including its outer circumferential surfaces, will be of uniform density. A magnetic core having the foregoing characteristics possesses improved magnetic, electrical and mechanical properties as compared to corresponding properties of cores produced according to prior art teachings.

According to the preferred embodiment of the invention, the body member 18 includes an insert 41 comprising a single piece of carbide material and the center plug 60 and pressure ring 78 may also be formed of carbide material. In order to obtain cores of compressed particles of metallic material having substantially uniform density characteristics as described above, it is necessary to provide a super finish on the core defining surfaces. It has been found that carbide material, such as tungsten carbide, is capable of receiving a super finish which is maintained throughout a large number of core forming operations in spite of the highly abrasive action of the particles of metallic material. Also, it is believed carbide material has a lower coefficient of friction, as compared to steel die surfaces employed heretofore, which aids, in the removal of formed cores from the pressure cavity. In the prior molding dies including a plurality of arcuate die sections it was not possible to employ a carbide insert to define the outer contour of the pressure cavity since the inherent flexure of the die sections would break the carbide material.

Figure 14:
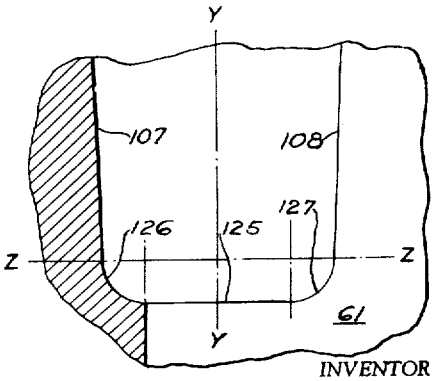
FIGURE 14 is a fragmentary view, in section, of another embodiment of the present invention.

Another form of cavity construction is shown in FIGURE 14 of the drawings. As shown, the outer and inner walls of the cavity are formed by tapered surfaces 107 and 108, respectively, and the bottom of the cavity includes a flat surface 125 having its edges merged with curved surfaces 126 and 127 which in turn merge with the lower edges of the outer and inner side walls, respectively. This type of cavity construction has particular utility in connection with the formation of cores having relatively large spacing between the inner and outer wall surfaces. In the cavity structure shown in FIGURE 14 and in FIGURE 8 the dividing line between the center plug and the body member lies along a line which intersects the bottom of the cavity at the point of tangency thereon with a plane perpendicular to the longitudinal axis of the cavity. In FIGURE 8, in which the bottom of the cavity is formed by a curved surface, which in section defines a semi-circle, there exists one point of tangency on the bottom surface with a plane perpendicular to the longitudinal axis of the cavity, and the dividing line between the center plug and the die body coincides with the axis Y—Y. In FIGURE 14, however, there exist two points of tangency and the dividing line between the center plug and the die body preferably passes through the point of tangency adjacent the outer wall of the cavity. Although in the form of pressure cavity of the character shown in FIGURE 14 the dividing line may be displaced from the position shown inwardly toward the longitudinal axis of the cavity, location of the dividing line as shown in this figure and also as shown in FIGURE 8 provides the maximum area of contact between the formed core and the center plug for the particular type of cavity without presenting difficult problems that would exist if the dividing line was displaced outwardly from the position shown in FIGURE 14 or inwardly or outwardly from the position shown in FIGURE 8. Inasmuch as a greater area of the core contacts the outer surface of the cavity than the area of the core that contacts the inner surface of the cavity, more pressure will be required to move the core relative to the die body than will be required to move the core relative to the center plug. Consequently, the feature of forming the center plug to provide the flat surface 125 of the bottom of the cavity provides the maximum permissible area of contact between the core and the center plug and makes it possible to apply forces of the necessary magnitude to remove the core from the die body without imparting injury to the core.

In operation, the table 10 is rotated in a predetermined direction to successively move the molding dies 12 to a charging station, the pressing station and the ejector station, in the order named. At the charging station a mechanism is provided for introducing a predetermined quantity of powdered material into the pressure cavity, the quantity of the charge depending upon the size of pressure cavity. When a molding die is located at the charging station the center plug 60 is positioned relative to the body member 18 as shown in FIGURE 2. Before the charge of powdered material is introduced into the pressure cavity, the surfaces defining the pressure cavity are coated with a suitable lubricating material. A separate station, preceding the filling station, may be provided for this operation. After the pressure cavity is charged, the table is rotated to position the molding die at the pressure or core forming station in proper relation with the anvil 71 and the pressure ring 78 as shown in FIGURE 4. Thereupon the pressure plate 75 is moved downwardly to move the pressure ring into the cavity in contact with the charge of powdered material and the required pressure is applied to form an integral core, such as a pressure of 200,000 to 250,000 pounds per square inch. FIGURE 5 shows the relative positions of the pressure ring and molding die during the core forming operation. The applied pressure is equally distributed between the center plug and the body member, due to the design of the pressure cavity *and is* transmitted independently to the anvil, without loading the table. Following the core forming operation the pressure is relieved and the pressure ring removed from the cavity. Thereupon the table is rotated to move the molding die to the ejector station shown in FIGURE 6. After location at this station, the plunger 95 is moved upwardly into the bore 43 to move the center plug 60 upwardly relative to the body member, as shown in FIGURE 7. The formed core 90 moves upwardly with the center plug and is removed from the opening provided in the insert 41. When the center plug is in its ejecting position the core 90 may be removed therefrom by applying upward movement to the core relative to the center plug. The core 90 may also be removed by placing a support beneath the core and applying a downward force on the center plug. The support may thereafter function as a means for delivering the core from the machine. The center plug is then retracted to its normal position and the molding die in a condition to be moved to the charging station to receive another charge of powdered material and proceed through the sequence of operations described above.

The principles of the present invention may be employed to form bodies from powdered material, especially in cases where extremely high pressures are required, such as bodies of powdered carbonyl or reduced iron or magnetic cores of insulated particles of magnetic material of high permeability such as Permalloy, flakenol or alfenol, for example. In the formation of magnetic cores of compressed insulated particles of magnetic material according to the present invention, the novel features described above which result in application of uniform pressure to the core during its formation and the production of a core of substantially uniform density, also insures that the effectiveness of the insulation of the magnetic particles is not impaired and that the core possesses substantially uniform insulation effectiveness. Thus cores of compressed insulated particles of magnetic material formed according to the principles of the present invention exhibit relatively low eddy current losses when incorporated in a coil.

There is thus provided by the present invention a novel magnetic core of compressed insulated particles of magnetic material which possesses improved magnetic, electrical and mechanical characteristics as compared to magnetic cores produced by following prior methods and apparatus. The core may be of toroidal shape, of substantially perfect circular cross-section having concentric inner and outer side walls and includes substantially smooth, continuous surfaces. The present invention provides a novel molding die structure for use in forming cores of powdered material requiring application of relatively high pressure. The novel molding die structure is characterized by a single block of material presenting a continuous surface defining the outer contour of a pressure cavity. This feature makes it possible to form cores of a shape substantially corresponding to the shape of the pressure cavity, such as cores of substantially circular cross section having concentric inner and outer side walls. The pressure cavity of the novel molding die is formed in part by a center plug and is designed in such a manner as to permit removal of a formed core from the cavity upon movement of the center plug and overcomes prior core removal difficulties which required the use of a plurality of arcuate die sections and makes it practicable to form cores by an automatic operation.

Although several embodiments of the invention have been disclosed and described herein, it is to be expressly understood that various changes and substitutions may be made therein without departing from the spirit of the invention as well understood by those skilled in the art. Reference therefore will be had to the appended claims for a definition of the limits of the invention.

What is claimed is:

1. Molding apparatus comprising a body member including a single piece of rigid material having a top surface and a bottom surface and an opening therethrough defined by a continuous internal wall of circular cross-section extending through the body member from the top surface to the bottom surface, the internal wall including a lower part and an upper part, the lower part of the internal wall extending from the bottom surface in a direction toward the top surface and including a constant diameter portion having a terminating end lying in a plane perpendicular to the central axis of the opening and located intermediate the top surface and the bottom surface, the upper part of the internal wall extending from the top surface in a direction toward the bottom surface and including a first portion and a second portion, the first portion of the internal wall being tapered with its diameter decreasing in a direction from the top surface toward the bottom surface and terminating in a small diameter end having a radius greater than the radius of the constant diameter portion and lying in a plane perpendicular to the central axis and spaced from the plane of the terminating end of the constant diameter portion of the internal wall, the second portion of the internal wall extending from the small diameter end of the internal wall to the terminating end of the constant diameter portion of the internal wall and including a concave surface extending from the small diameter end of the internal wall in a direction toward the bottom surface and inwardly toward the central axis and terminating in the plane of the terminating end of the constant diameter portion of the internal wall, an elongated member positioned in the opening of the body member, the elongated member including a continuous external wall of circular cross-section having a lower part and an upper part, the lower part of the external wall being of constant diameter for snug sliding engagement with the constant diameter portion of the internal wall to position the elongated member in the opening of the body member with the longitudinal axis of the elongated member coincident with the central axis of the opening, the constant diameter portion of the external wall having a terminating end lying in a plane perpendicular to the longitudinal axis and located intermediate the ends of the elongated member, the upper part of the external wall including a first portion and a second portion, the first portion of the external wall being tapered with its diameter increasing in a direction toward the lower part of the elongated member and terminating in a large diameter end having a radius less than the radius of the lower part of the external wall and lying in a plane perpendicular to the longitudinal axis and spaced from the plane of the terminating end of the constant diameter portion of the external wall, the second portion of the external wall extending from the large diameter end of the external wall to the terminating end of the constant diameter portion of the external wall and including a concave surface extending from the large diameter end of the external wall in a direction toward the lower part of the external wall and away from the longitudinal axis and terminating in the plane of the terminating end of the constant diameter portion of the external wall, the upper part of the internal wall and the upper part of the external wall defining a pressure cavity upon the elongated member and the body member being relatively positioned with the terminating end of the constant diameter portion of the external wall and the terminating end of the constant diameter portion of the external wall lying in a common plane, and a pressure ring mounted above the body member for movement in a direction toward the top surface of the body member and into the pressure cavity.

2. A molding apparatus as defined in claim 1 in which the upper part of the internal wall and the upper part of the external wall are formed of carbide material.

3. A molding apparatus as defined in claim 1 in which the upper part of the external wall and the upper part of the internal wall are symmetrical with respect to an imaginary cylindrical surface concentric with the central axis of the opening of the body member and bisecting the pressure cavity.

4. A molding apparatus as defined in claim 3 in which the concave surface of the second portion of the internal wall extends to the terminating end of the constant diameter portion of the internal wall and in which the central axis of the constant diameter portion of the internal wall is perpendicular to a plane in tangential relation with the concave surface of the internal wall.

5. A molding apparatus as defined in claim 4 in which the concave surface of the second portion of the external wall extends to the terminating end of the constant diameter portion of the external wall, in which the constant diameter portion of the external wall is perpendicular to a tangent of the concave surface of the external wall, and in which the imaginary cylindrical surface is coincident with the engaging surfaces of the constant diameter portions of the internal wall and the external wall.

6. A molding apparatus as defined in claim 4 in which the second portion of the external wall includes an annular surface lying in a plane perpendicular to the longitudinal axis, in which the concave surface of the external wall extends to the small diameter edge of the annular surface, and in which the large diameter edge of the annular surface is at the terminating end of the constant diameter portion of the external wall.

7. A molding apparatus as defined in claim 1 including means positioning the terminating end of the constant diameter portion of the internal wall and the terminating end of the constant diameter portion of the external wall in a common plane.

8. A molding apparatus as defined in claim 1 in which the pressure ring includes a hollow cylindrical member having a cylindrical internal surface and a cylindrical external surface concentric with the longitudinal axis of the elongated member, a flat annular end face lying in a plane perpendicular to the longitudinal axis, a convexly curved circumferential edge extending between the outer circular edge of the annular end face and the cylindrical external surface, and a convexly curved circumferential edge extending between the inner circular edge of the annular end face and the cylindrical internal surface.

9. A molding apparatus as defined in claim 1 including a supporting means for the body member having a first side in contact with the bottom surface of the body member, the supporting means having an opening for the elongated member, and anvil means in contiguous relation with the second side of the supporting means and in contact with the elongated member.

10. A molding apparatus as defined in claim 9 in which the second side of the supporting means is spaced a predetermined distance from the anvil means, in which planes passing through the terminating ends of the constant diameter portions of the lower part of the internal wall and lower part of the external wall are spaced a distance equal to the predetermined distance, and in which the supporting means is movable in a direction toward the anvil means into contact with the anvil means to position the terminating ends of the constant diameter portions of the internal wall and external wall in a common plane.

*11. Molding apparatus comprising a body member formed of a single piece of rigid material and having an opening therein,*

*an insert in the opening of the body member,*

*the insert having a top surface and a bottom surface and an opening therethrough defined by an internal wall of circular cross-section extending through the insert from the top surface to the bottom surface,*

*the internal wall including a lower part and an upper part,*

*the lower part of the internal wall extending from the bottom surface in a direction toward the top surface and including a constant diameter portion having a terminating end lying in a first plane perpendicular to the central axis of the opening of the insert and located intermediate the top surface and the bottom surface,*

*the upper part of the internal wall extending from the*

*top surface in a direction toward the bottom surface and including a first portion and a second portion,*

*the first portion of the upper part of the internal wall being tapered with its diameter decreasing in a direction from the top surface toward the bottom surface and terminating in a small diameter end having a radius greater than the radius of the constant diameter portion and lying in a second plane perpendicular to the central axis,*

*the second plane being spaced from the first plane and being located between the top surface and the first plane,*

*the first portion of the upper part of the internal wall comprising a closed surface,*

*the second portion of the upper part of the internal wall extending from the small diameter end of the first portion of the internal wall to the terminating end of the constant diameter portion,*

*the second portion of the upper part of the internal wall comprising a closed surface and including a concave surface extending from the small diameter end of the first portion in a direction toward the bottom surface and inwardly toward the central axis,*

*an elongated member having a top end and a bottom end,*

*the elongated member being positioned in the opening of the insert with the longitudinal axis of the elongated member coincident with the central axis for relative axial movement and with the top end of the elongated member facing in a direction from the bottom surface toward the top surface of the insert,*

*the elongated member including an external wall of circular cross-section having a lower part and an upper part,*

*the lower part of the external wall including a constant diameter portion in engagement with the constant diameter portion of the internal wall,*

*the constant diameter portion of the external wall having a terminating end lying in a third plane perpendicular to the longitudinal axis of the elongated member and located between the top end and the bottom end of the elongated member,*

*the upper part of the external wall including a first portion and a second portion,*

*the first portion of the upper part of the external wall being tapered with its diameter increasing in a direction from the top end of the elongated member toward the lower part of the elongated member and terminating in a large diameter end having a radius less than the radius of the constant diameter portion of the external wall and lying in a fourth plane perpendicular to the longitudinal axis,*

*the fourth plane being spaced from the third plane and being located between the top end of the elongated member and the third plane.*

*the first portion of the upper part of the external surface comprising a closed surface,*

*the second portion of the upper part of the external wall extending from the large diameter end of the external wall to the terminating end of the constant diameter portion of the external wall,*

*the second portion of the upper part of the external wall comprising a closed surface and including a concave surface extending from the large diameter end of the external wall in a direction toward the lower part of the external wall and away from the longitudinal axis,*

*the closed surfaces of the first portion and the second portion of the upper part of the internal wall and of the first portion and the second portion of the upper part of the external wall defining a pressure cavity upon the elongated member and the body member being relatively positioned with the terminating end of the constant diameter portion of the external wall and the terminating end of the constant diameter portion of the external wall lying in a common plane.*

*and a pressure ring mounted above the body member for movement in a direction toward the top surface of the insert into the pressure cavity.*

References Cited in the file of this patent or the original patent

UNITED STATES PATENTS

| | | |
|---|---|---|
| 1,305,975 | Pfanstiehl | June 3, 1919 |
| 1,600,828 | Latour | Sept. 21, 1926 |
| 1,855,855 | Gillis et al. | Apr. 26, 1932 |
| 1,858,225 | Frederick | May 10, 1932 |
| 1,974,056 | Schrell | Sept. 18, 1934 |
| 2,093,029 | Bolk | Sept. 14, 1937 |
| 2,218,669 | Whipple | Oct. 22, 1940 |
| 2,282,155 | Bandur | May 5, 1942 |
| 2,449,515 | Seelig | Sept. 14, 1948 |
| 2,495,064 | Horvath | Jan. 17, 1950 |
| 2,536,689 | Kress et al. | Jan. 2, 1951 |
| 2,558,823 | Crowley et al. | July 3, 1951 |
| 2,562,876 | Baeza | Aug. 7, 1951 |
| 2,583,441 | Dalmer | Jan. 22, 1952 |
| 2,798,255 | Winters | July 9, 1957 |
| 2,800,684 | Luthman | July 30, 1957 |
| 2,842,822 | Clough et al. | July 8, 1958 |

FOREIGN PATENTS

| | | |
|---|---|---|
| 1,082,839 | France | June 23, 1954 |